No. 629,934. Patented Aug. 1, 1899.
W. F. STIMPSON.
SPRING COMPUTING SCALE.
(Application filed Apr. 25, 1898.)

(No Model.) 2 Sheets—Sheet 1.

Witnesses
Inventor
Walter F. Stimpson
By Chas. S. Sprague & Son
Attys.

No. 629,934. Patented Aug. 1, 1899.
W. F. STIMPSON.
SPRING COMPUTING SCALE.
(Application filed Apr. 25, 1898.)
(No Model.) 2 Sheets—Sheet 2.
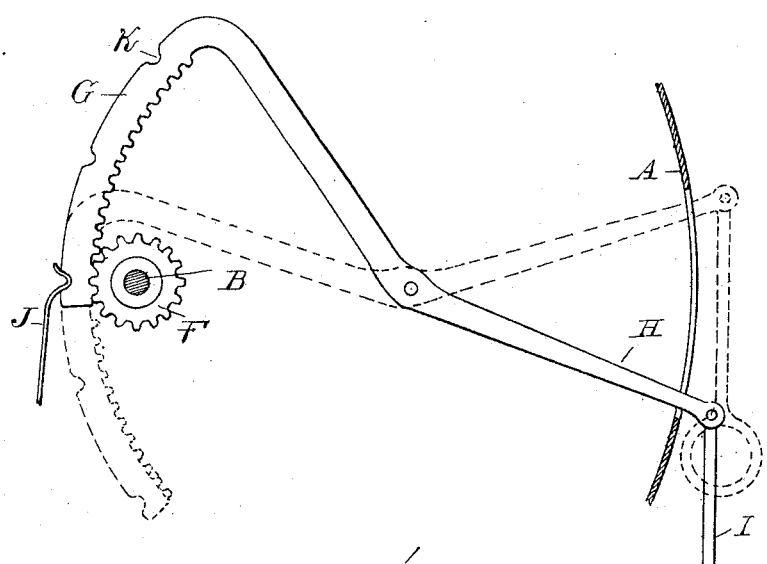
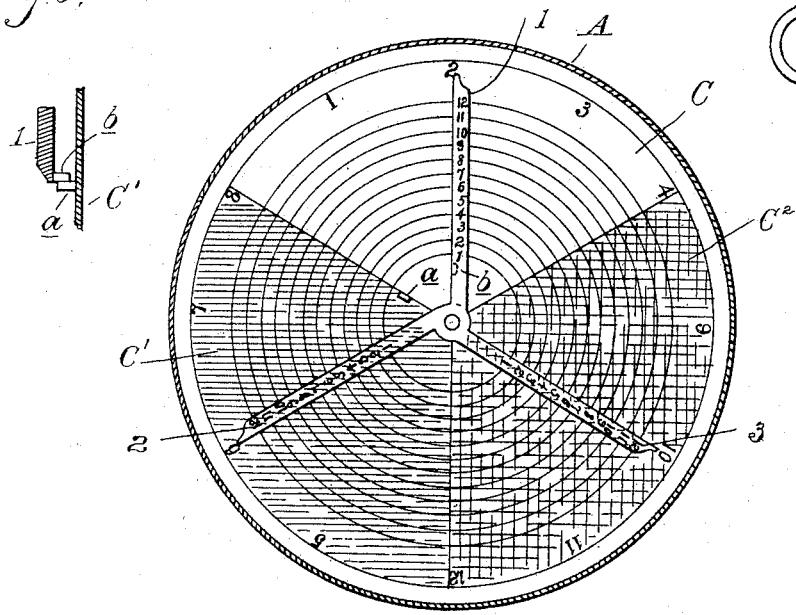

UNITED STATES PATENT OFFICE.

WALTER F. STIMPSON, OF MILAN, MICHIGAN.

SPRING COMPUTING-SCALE.

SPECIFICATION forming part of Letters Patent No. 629,934, dated August 1, 1899.

Application filed April 25, 1898. Serial No. 678,738. (No model.)

*To all whom it may concern:*

Be it known that I, WALTER F. STIMPSON, a citizen of the United States, residing at Milan, in the county of Washtenaw and State of Michigan, have invented certain new and useful Improvements in Spring Computing-Scales, of which the following is a specification, reference being had therein to the accompanying drawings.

The invention consists in the construction of a computing-scale, and particularly in the construction of the indicating mechanism therefor, comprising a plurality of indices moved successively across a portion of an indicating-plate and means for bringing to that point across which the indices move different series of computations upon different parts of the plate or dial.

The invention further consists in the construction, arrangement, and combination of the various parts, all as more fully hereinafter described.

I have shown my invention as if it were used on an ordinary dial spring-scale so far as the weighing mechanism is concerned, and therefore I do not deem it necessary to show the weighing mechanism or the other details of construction regarding the scale, except so far as it relates to my invention.

Figure 1:
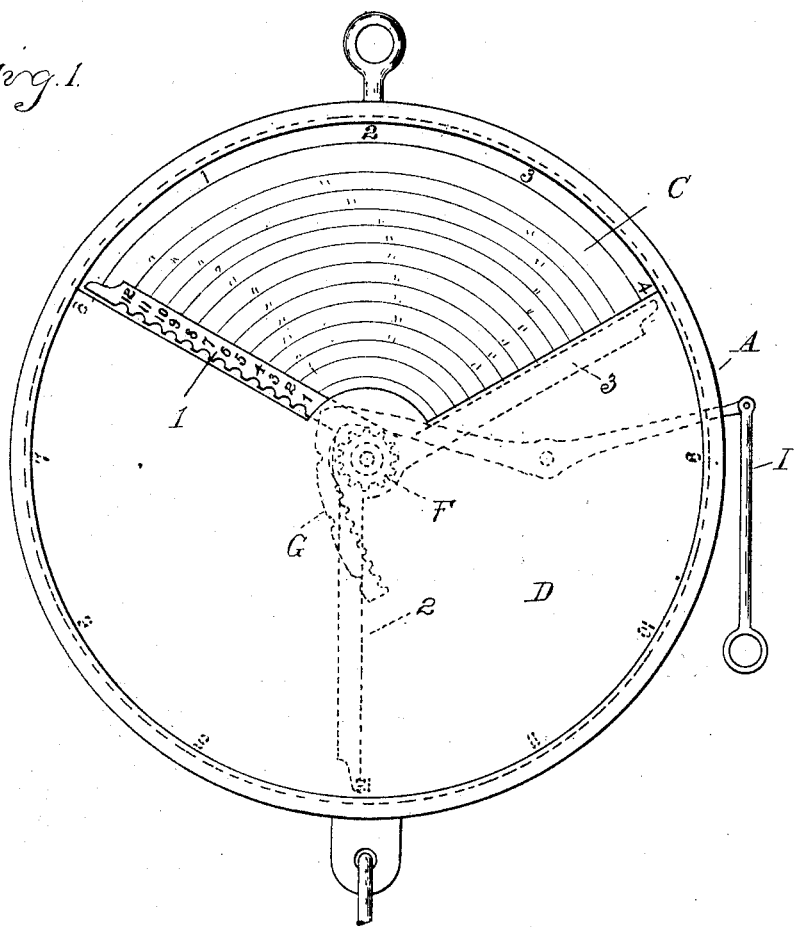
Figure 2:
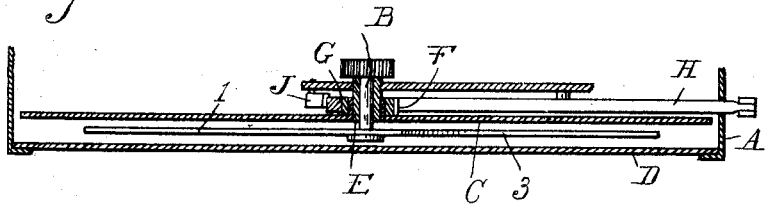

Figure 1 is a front elevation of a dial of a scale embodying my invention. Fig. 2 is a central horizontal cross-section thereof. Fig. 3 is an elevation of the actuating-lever for the dial or computation plate. Fig. 4 is an elevation of the dial and the indices of the front plate removed. Fig. 5 is a detail section illustrating the returning means for the dial.

A is the circular head of an ordinary spring-scale adapted usually to be hung up and having a pan suspended below, upon which the article to be weighed is placed, and a suitable spring to determine the amount of lowering of the pan, regulating, by suitable gears, the movement of the shaft B, which carries usually a single index and which sometimes moves the dial. In the drawings I have shown the dial as stationary and the indices as moving.

Upon the shaft B are secured a multiple of indices. In this case I have shown three, numbered "1," "2," and "3," respectively.

C is the face-plate or dial, which is marked along its edge with its weight-indications and intermediate that point and its center is marked with computations, being in line with the price per pound marked upon the index, as plainly shown in Fig. 1. In this case I have shown the dial covered by a face-plate D sufficient to leave exposed to view at the top one section of the dial, being in this particular illustration one-third, and this I shall refer to as the "section" of the dial in the reading or weighing position.

Supposing the parts to be as shown in Fig. 1, if weight were thrown on the platform the index 1 would be moved across the exposed or reading portion of the dial and indicate the desired computation up to four pounds at any price per pound which is marked upon that index. If more than four pounds were placed upon the scale-pan, the index 1 would pass off from the reading portion of the dial and the index 2 would move over the same, the index 2 coming onto the reading portion as the index 1 leaves it. It is evident that if the dial were left in this position that when the index 2 came over the reading portion exposed in Fig. 1 an erroneous weight and an erroneous computation would be indicated, and therefore I provide means for bringing another section of the dial particularly marked for the second index into the reading position when the second index is to be used. This I accomplish by making the dial C movable, journaling it so that it may be rotated, as plainly shown in Fig. 2, and on its hub E, I place a pinion F, with which a segmental rack G engages, this segmental rack being connected to the end of a lever H, which extends to the side of the case and is provided with a hand-pull I. Now when the second index comes into position to indicate the operator takes hold of the hand-pull I and draws down sufficiently to rotate the disk C to bring another section C' (indicated in Fig. 4) into the reading position, which second section is marked with proper weights and computations for use with the second index, (numbered "2.") I also provide a third section of the dial bearing a corresponding weight indication and higher sums of the price per pound which may be brought into reading position by drawing upon the hand-pull I and which is adapted to be used in connection with the third index $C^2$.

I preferably indicate in some suitable manner which index is to be used with each section. For instance, I may make each index and its proper reading section of the dial of the same color, so that the operator would know at once whether he has the proper index for use with the exposed reading section of the dial.

It is desirable to lock the dial in its adjusted position, and this I preferably accomplish by means of the spring J, engaging the notches K in the segment G, as plainly shown in Fig. 3.

I preferably provide automatic means for returning the dial upon the return of the indices, which comprises a stop $a$ on the dial and a stop $b$ on the first index adapted to engage therewith. Whenever the dial has been moved to either of its adjusted positions, upon removing the weight from the scale-platform the indices will be returned and the stop $b$, striking against the stop $a$, will carry the dial to its initial position.

What I claim as my invention is—

1. In a computing-scale, a dial divided into sections, each section having a different series of computations, and one section being in position to be used in weighing, means for turning the dial to bring another section into weighing position and a multiple of indices, one for each section, adapted to be moved successively over the section in the weighing position and bearing figures indicating the prices per pound at which the computations on the dial are figured.

2. In a computing-scale, a dial having a multiple of sections of different computations, the computations being successively higher multiples of the same price per pound, and but one section being adapted to be in "reading" position at one time, means for moving the dial to bring any one of the sections to the "reading" position and weight-actuated indices, bearing prices per pound adapted to be moved successively over the exposed or "reading" portion of the dial.

3. In a spring computing-scale, a rotatably-mounted dial divided into a plurality of segmental sections, each provided with a different series of computations, a cover for the dial constructed to expose one entire section only, a plurality of weight-actuated indices corresponding in number to the dial-sections, each having marked thereon computations corresponding to the computations upon the dial-section with which it is adapted to be used, said indices being rotatably mounted for successive movement across the opening in the cover, and means for rotating the dial to successively expose the segmental sections, substantially as described.

4. In a spring-scale, a rotatably-mounted dial divided into a plurality of independent segmental sections, and a cover for said dial constructed to expose one entire section only, means for rotating the dial to expose other sections, means for automatically locking the dial upon the entire exposure of each of the sections, and a series of weight-actuated indices mounted for successive movement across the exposed sections of the dial.

In testimony whereof I affix my signature in presence of two witnesses.

WALTER F. STIMPSON.

Witnesses:
 M. B. O'DOGHERTY,
 OTTO F. BARTHEL.